US011108238B2

(12) United States Patent
Brombach et al.

(10) Patent No.: US 11,108,238 B2
(45) Date of Patent: Aug. 31, 2021

(54) METHOD FOR OPERATING A WIND FARM

(71) Applicant: Wobben Properties GmbH, Aurich (DE)

(72) Inventors: Johannes Brombach, Berlin (DE); Ingo Mackensen, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/619,421

(22) PCT Filed: Jun. 7, 2018

(86) PCT No.: PCT/EP2018/065031
§ 371 (c)(1),
(2) Date: Dec. 4, 2019

(87) PCT Pub. No.: WO2018/224596
PCT Pub. Date: Dec. 13, 2018

(65) Prior Publication Data
US 2020/0176993 A1    Jun. 4, 2020

(30) Foreign Application Priority Data
Jun. 7, 2017    (DE) .................... 10 2017 112 491.8

(51) Int. Cl.
*H02J 3/38*    (2006.01)
*H02J 3/50*    (2006.01)
*F03D 9/25*    (2016.01)

(52) U.S. Cl.
CPC .............. *H02J 3/381* (2013.01); *F03D 9/257* (2017.02); *H02J 3/50* (2013.01); *H02J 2300/28* (2020.01)

(58) Field of Classification Search
CPC .......... H02J 3/381; H02J 3/50; H02J 2300/28; F03D 9/257
(Continued)

(56) References Cited

U.S. PATENT DOCUMENTS 8,378,514 B2    2/2013   Fortmann et al.
8,902,618 B2 *  12/2014  Godridge ................ H02J 3/381
                                                           363/74

(Continued)

FOREIGN PATENT DOCUMENTS

DE    102006050077 A1    5/2008
DE    102013207264 A1    10/2014
(Continued)

OTHER PUBLICATIONS

Annual Report 2016 of the Technical University of Braunschweig, Institute for High Voltage and Electrical Power Systems, pp. 54-56. (7 pages).

(Continued)

*Primary Examiner* — Pedro J Cuevas
(74) *Attorney, Agent, or Firm* — Seed IP Law Group LLP

(57) ABSTRACT

Provided is a method for operating a wind power installation or a wind farm with a number of wind power installations for exchanging electrical power between the wind farm and an electrical supply grid. Each wind power installation has one or more feeding-in devices. The wind power installation or the wind farm is connected to the electrical supply grid by a grid connection point. The power is exchanged by way of the grid connection point. One or more of the feeding-in devices operate as voltage-influencing units and one or more of the feeding-in devices operate as current-influencing units. The voltage-influencing units and the current-influ- (Continued)

encing units also operate in a voltage-influencing and current-influencing manner during undisturbed operation of the electrical supply grid.

20 Claims, 5 Drawing Sheets

(58) Field of Classification Search
USPC ..................................................... 290/44, 55
See application file for complete search history.

(56) References Cited

U.S. PATENT DOCUMENTS

| | | | | |
|---|---|---|---|---|
| 9,035,480 | B2* | 5/2015 | Fortmann | H02J 3/16 |
| | | | | 290/44 |
| 9,556,852 | B2 | 1/2017 | Babazadeh et al. | |
| 9,912,162 | B2* | 3/2018 | Giertz | F03D 7/048 |
| 9,960,603 | B2* | 5/2018 | Dorn | F03D 9/007 |
| 10,011,910 | B2* | 7/2018 | Phillips | C25B 9/08 |
| 10,072,634 | B2* | 9/2018 | Busker | F03D 9/257 |
| 10,132,294 | B2* | 11/2018 | Beekmann | H02J 3/12 |
| 10,161,385 | B2 | 12/2018 | Busker et al. | |
| 10,539,118 | B2* | 1/2020 | Jessen | H02J 3/38 |
| 10,683,846 | B2* | 6/2020 | Brombach | F03D 9/255 |
| 10,707,684 | B2* | 7/2020 | Brombach | H02J 3/38 |
| 10,784,690 | B2* | 9/2020 | Brombach | H02J 3/386 |
| 10,794,364 | B2* | 10/2020 | Brombach | H02J 3/38 |
| 2008/0088129 | A1* | 4/2008 | Altemark | H02J 3/381 |
| | | | | 290/44 |
| 2011/0103110 | A1* | 5/2011 | Godridge | H02J 3/381 |
| | | | | 363/74 |
| 2012/0104756 | A1 | 5/2012 | Beekmann et al. | |
| 2012/0248772 | A1 | 10/2012 | Shigemizu et al. | |
| 2013/0241201 | A1* | 9/2013 | Fortmann | H02J 3/386 |
| | | | | 290/44 |
| 2014/0204633 | A1 | 7/2014 | Khajehoddin et al. | |
| 2015/0069836 | A1 | 3/2015 | Beekmann | |
| 2016/0131109 | A1* | 5/2016 | Busker | H02J 3/46 |
| | | | | 290/44 |
| 2016/0201651 | A1* | 7/2016 | Beekman | F03D 7/048 |
| | | | | 290/44 |
| 2016/0226258 | A1* | 8/2016 | Giertz | H02J 3/386 |
| 2017/0005478 | A1* | 1/2017 | Dorn | H02M 7/44 |
| 2017/0163040 | A1 | 6/2017 | Bamberger et al. | |
| 2017/0198401 | A1* | 7/2017 | Phillips | F03B 13/16 |
| 2018/0372074 | A1* | 12/2018 | Brombach | H02J 3/386 |
| 2019/0036342 | A1* | 1/2019 | Brombach | H02J 3/386 |
| 2019/0067943 | A1* | 2/2019 | Brombach | H02J 3/46 |
| 2019/0162166 | A1* | 5/2019 | Jessen | F03D 7/028 |
| 2019/0211803 | A1* | 7/2019 | Brombach | F03D 9/257 |
| 2019/0312431 | A1* | 10/2019 | Brombach | H02K 7/183 |
| 2020/0014213 | A1* | 1/2020 | Brombach | H02J 3/14 |
| 2020/0028367 | A1* | 1/2020 | Brombach | H02J 3/381 |
| 2020/0049131 | A1* | 2/2020 | De Boer | H02J 3/24 |
| 2020/0052628 | A1* | 2/2020 | Busker | F03D 9/257 |
| 2020/0059102 | A1* | 2/2020 | Brombach | H02J 3/381 |
| 2020/0059178 | A1* | 2/2020 | Brombach | H02M 1/32 |
| 2020/0116127 | A1* | 4/2020 | Brombach | F03D 7/0284 |
| 2020/0119560 | A1* | 4/2020 | Brombach | H02P 9/10 |
| 2020/0124023 | A1* | 4/2020 | Beekmann | H02J 3/16 |
| 2020/0130527 | A1* | 4/2020 | Brombach | H02J 7/00 |
| 2020/0136540 | A1* | 4/2020 | Brombach | H02J 3/381 |
| 2020/0144822 | A1* | 5/2020 | Hinterberger | H02J 1/10 |
| 2020/0176994 | A1* | 6/2020 | Hinterberger | H02J 1/08 |
| 2020/0176996 | A1* | 6/2020 | Hinterberger | H02J 1/08 |
| 2020/0191118 | A1* | 6/2020 | Busker | F03D 9/257 |
| 2020/0227918 | A1* | 7/2020 | Busker | H02J 3/386 |
| 2020/0274360 | A1* | 8/2020 | Biris | F03D 9/255 |
| 2020/0277934 | A1* | 9/2020 | Gertjegerdes | F03D 7/047 |
| 2020/0328599 | A1* | 10/2020 | Brombach | H02J 13/00002 |
| 2020/0350765 | A1* | 11/2020 | Christensen | H02J 3/001 |
| 2020/0350769 | A1* | 11/2020 | Mackensen | H02J 3/381 |
| 2020/0366100 | A1* | 11/2020 | Brombach | H02P 9/42 |

FOREIGN PATENT DOCUMENTS

| | | |
|---|---|---|
| DE | 102014214151 A1 | 1/2016 |
| JP | 2011067078 A | 3/2011 |
| JP | 2012217290 A | 11/2012 |
| RU | 2516381 C2 | 5/2014 |
| RU | 2597235 C2 | 9/2016 |

OTHER PUBLICATIONS

Pogaku et al., "Modeling, Analysis and Testing of Autonomous Operation of an Inverter-Based Microgrid," *IEEE Transactions on Power Electronics* 22(2):613-625, Mar. 2007.

Wang et al., "Modeling and Analysis of Droop Based Hybrid Control Strategy for Parallel Inverters in Islanded Microgrids," 2017 IEEE Applied Power Electronics Conference and Exposition (APEC), Mar. 26, 2017, pp. 3462-3469.

Kurrat et al., "Jahresbericht 2016", Institut für Hochspannungstechnik and Elektrische Energieanlagen (Kurrat et al., "Annual Report 2016", Institute for High Voltage Technology and Electrical Power Systems), Dec. 31, 2016, retrieved from:https://www.tu-braunschweigs.de/fileadmin/Redaktionsgruppen/Institute_Fakultaet_5/Elenia/institut/Jahresbericht/Jahresbericht_2016.pdf.

* cited by examiner

METHOD FOR OPERATING A WIND FARM

BACKGROUND

Technical Field

The present invention relates to a method for operating a wind farm. The present invention also relates to a corresponding wind farm.

Description of the Related Art

Wind farms are known in principle and comprise a number of wind power installations. The wind power installations of the wind farm then together feed electric power into an electrical supply grid, in particular by way of a common grid connection point.

With the increasing dominance of decentralized feeding-in units such as wind power installations or wind farms in the electrical supply grid, it is becoming increasingly important that wind farms also make a contribution to controlling the electrical supply grid. Such methods are also already known, and for example, on a frequency-dependent basis, wind farms feed in a correspondingly greater or lesser amount of reactive power. Reducing the amount of power fed in or briefly increasing the real power fed in also comes into consideration as a way in which wind farms control or support the electrical supply grid.

However, a greater proportion of decentralized, in particular converter-controlled, feeding-in suppliers also has the effect of changing the way in which the electrical supply grid behaves. Known supporting measures, such as changing the power on a frequency-dependent basis can then sometimes no longer be suitable, because the changing described possibly makes the electrical supply grid react fundamentally differently.

The reaction to a changed grid behavior could be in principle a switchover between different controllers. The laid-open patent application DE 10 2013 207 264 A1 proposes a controller switchover for this. It is questionable, however, whether with such a controller switchover all grid changes or even changed grid requirements can be addressed.

The German Patent and Trademark Office has also searched the following prior art in the priority application relating to the present application: DE 10 2006 050 077 A1, DE 10 2014 214 151 A1 and the Annual Report 2016 of the Technical University of Braunschweig, Institute for High Voltage Technology and Electrical Power Systems (elenia), pages 54-56.

BRIEF SUMMARY

Provided is a method intended for operating a wind power installation or a wind farm comprising a number of wind power installations for exchanging electrical power between the wind farm and an electrical supply grid. In particular, it is concerned with controlling the feeding into the electrical supply grid by the wind farm, but it also comes into consideration that the wind power installation or the wind farm takes power from the electrical supply grid, particularly in the case of special grid supporting operations. To this extent, the method relates generally to the operation of a wind power installation or a wind farm for exchanging electrical power between the wind power installation or the wind farm and the electrical supply grid.

The method assumes that each of the wind power installations comprises one or more feeding-in devices. Particularly, at least one converter or inverter may be provided for each wind power installation. Preferably, to realize higher power, a number of converters or inverters are connected in parallel. In that case, a wind power installation then has a number of feeding-in devices. If the method only relates to the operation of one wind power installation, the latter has a number of feeding-in devices, but for the operation of a wind farm it is preferably the case that a number of feeding-in devices are provided in each wind power installation. A distinction between converter and inverter is only of secondary importance here and, unless anything else is explained or anything else is obvious, any explanations concerning converters should also be understood as explanations concerning inverters, and vice versa. As long as they do not concern aspects peculiar to a wind farm, any explanations of a wind farm that are described hereafter should also be applied analogously to an individual wind power installation.

It is also assumed that the wind power installation or the wind farm is connected to the electrical supply grid by way of a grid connection point and the power is exchanged by way of the grid connection point. The wind power installations of the wind farm therefore share a common grid connection point. In principle, the method is however also suitable for controlling a number of wind farms, each wind farm then being able to have a grid connection point of its own.

It is proposed that one or more of the feeding-in devices operate as voltage-influencing units. They consequently exchange power with the electrical supply grid in a voltage-influencing manner, in particular they feed into the electrical supply grid in a voltage-influencing manner. It is also proposed that one or more of the feeding-in devices operate as current-influencing units (or current-shaping units). They consequently exchange power with the electrical supply grid in a current-influencing manner, in particular they feed into the electrical supply grid in a current-influencing manner.

It is therefore proposed that the wind farm comprises one or more voltage-influencing units and one or more current-influencing units for feeding in. Such feeding-in units, that is to say voltage-influencing on the one hand and current-influencing on the other hand, may in principle operate differently. Operating as a voltage-influencing unit means particularly affecting a preset voltage. In simple terms, a voltage is fed back there, and to this extent forms the controlled variable, and the voltage-influencing unit correspondingly attempts to correct to this voltage, therefore to set this voltage.

By contrast, operating as a current-influencing unit means controlling a current in a closed-loop manner. In this case, therefore, a current is particularly output and measured and this measured value is compared as an actual value with a setpoint value and, depending on the difference between the setpoint value and the actual value, is correspondingly controlled in a closed-loop manner.

Consequently, some units operate in a voltage-influencing manner and others in a current-influencing manner. Preferably, it is proposed that the same units are the same with regard to their hardware, but they can optionally operate in a current-influencing or voltage-influencing manner, particularly by corresponding activation. However, it also comes into consideration that units which are voltage-influencing or current-influencing from the outset are provided, and they therefore differ in their hardware or their construction but can be activated or used according to requirements. In this case, it is proposed here that both voltage-influencing units and current-influencing units are activated in order to control the exchange of the power with the electrical supply grid.

With such combined operation, in which some units operate in a voltage-influencing manner and others in a current-influencing manner, it is also possible in principle to make allowance for changed requirements for the electrical supply grid. Particularly an electrical supply grid which, for example because of its topology, is itself poorly able to maintain its own voltage can be supported by means of voltage-influencing feeding in or voltage-influencing power exchange.

The voltage-influencing operation of some units allows a corresponding feed-in current, and consequently power, to be fed into the electrical supply grid particularly stably. This may, however, also involve feed-in current or power being taken from the grid, particularly for a short period of time.

In principle, however, voltage-influencing operation and current-influencing operation also allow the sharing of special closed-loop control tasks for which voltage-influencing operation and current-influencing operation are suited differently well. Examples of this are also given below.

It is particularly provided that the voltage-influencing units and the current-influencing units also operate in a voltage-influencing and current-influencing manner during undisturbed operation of the electrical supply grid. Undisturbed operation may also be referred to as normal operation. Undisturbed operation is consequently operation without disturbances, the term disturbances referring to significant disturbances, such as an interruption in the grid, a short-circuit in the electrical supply grid and in particular a grid recovery or black start of the electrical supply grid or a portion of the grid. The use of voltage-influencing and current-influencing units in a wind farm is consequently proposed generally, and is not intended to be restricted to a specific mode; it is particularly not intended to be restricted to a specific black-start mode, but is expressly intended for a normal operating mode. Undisturbed operation or normal operation is to this extent an operating mode in which the wind power installation or the wind farm is in operation to generate power from the wind and feed it into the electrical supply grid at the level at which the power can be generated from the wind. Such normal operation may be interrupted by special supporting modes of operation for which it is also advisable to combine the voltage-influencing and current-influencing units. The voltage- and current-influencing units are however not only switched on for special operating modes, but are already active in a voltage-influencing and current-influencing manner during normal operation.

It is preferably proposed that, for operation of the wind power installation or the wind farm, voltage-influencing units exchange power with the electrical supply grid in a voltage-influencing manner and at the same time current-influencing units exchange power with the electrical supply grid in a current-influencing manner. Exchanging power with the electrical supply grid in a voltage-influencing and current-influencing manner are consequently intended to take place at the same time. Therefore, it is not a case of choosing one or other of the two modes, but rather that they complement one another. Depending on the application, in particular depending on the situation in the electrical supply grid, it also comes into consideration that the ratio of operating in a voltage-influencing manner and operating in a current-influencing manner can be varied.

In any event, the current-influencing units in current-influencing operation respectively control a feed-in current that is to be fed into the electrical supply grid. The term feed-in current is also used here when electrical power is taken from the electrical supply grid. For this case, the feed-in current may be negative or its phase angle may be chosen in such a way that power is taken from the electrical supply grid.

In voltage-influencing operation, the voltage-influencing units control a feed-in voltage for feeding into the electrical supply grid. Here, the feed-in voltage is therefore the decisive target variable or controlled variable. In current-influencing operation, closed-loop control is therefore directed at the feed-in current and in voltage-influencing operation it is directed at the feed-in voltage. Current-influencing units are those that operate in a current-influencing manner and voltage-influencing units are those that operate in a voltage-influencing manner. However, this characteristic does not necessarily have to be permanently assigned to the respective unit, but may possibly also be achieved by corresponding changing of the control.

Preferably, the current-influencing units operate in such a way that they adapt themselves in current-influencing operation to the feed-in voltage, which particularly in a wind farm is present at the grid connection point. They therefore control the feed-in current, and the feed-in voltage forms a boundary condition for this, for which allowance is made. It is not attempted however to correct specifically to a voltage value, at least not in the sense that a voltage setpoint value is preset. This however does not affect the possibility of a higher-level closed-loop control responding to a voltage or voltage deviation, such as for example, to set a phase angle of the current in dependence on the voltage. In the case of this example, although the setting of the phase angle also has the purpose of having an effect on the level of the voltage, the closed-loop control or type of feeding in that is carried out here by the current-influencing unit is to correct to such a setpoint current.

In voltage-influencing operation, the voltage-influencing units respectively feed in a current that is required for controlling the feed-in voltage or is obtained by controlling the feed-in voltage. For voltage-influencing operation, consequently a setpoint current is not provided for the corresponding voltage-influencing units, but a setpoint voltage. It is attempted to achieve this voltage by using closed-loop control techniques, and that will result in a feed-in current. If, therefore, the feed-in voltage for example falls below a corresponding setpoint value for it, or otherwise deviates from a setpoint value, the respective voltage-influencing unit in voltage-influencing operation attempts to counteract this fall, and that may lead to a correspondingly increased feed-in current. Here, too, such a feed-in current may be of the kind that electrical power is taken from the grid.

According to one embodiment, the method operates in such a way that, in the case of an overfrequency in the electrical supply grid, the power fed into the electrical supply grid by the wind farm is reduced. For this purpose, the method may operate in such a way that the voltage-influencing units first reduce their feed-in power in an initial time period, in order thereby to bring about the reduction in the power fed in. With regard to the current-influencing units, the method may operate in such a way that they follow the voltage-influencing units by reducing their feed-in power, in order to bring about the reduction in the power fed in in a subsequent time period following the initial time period, when the reduction of the power fed in at the wind farm has assumed a steady value. Then, the voltage-influencing units are operated to carry out a process of maintaining the voltage and, in particular in the subsequent time period, leave the reduction of the power fed in by the wind farm to the current-influencing units. As a result, the voltage-influencing units undertake the acute first open-loop control or first closed-loop control by their voltage-influencing operation.

A frequency change in the electrical supply grid means initially that the frequency of the voltage in the electrical supply grid changes. Therefore, first an effect on the voltage is detected. This effect on the voltage by this frequency change consequently makes itself noticeable directly at the voltage-influencing units, since they record the voltage and attempt to maintain its setpoint value. It is not, or not only, rms voltages that are concerned here, but particularly also instantaneous values. If the frequency of the actual voltage changes in comparison with the frequency of the setpoint voltage, the phase angle between the actual voltage and the setpoint voltage also changes. That leads directly to a voltage deviation in each instantaneous value. The voltage-influencing unit, which is operating in voltage-influencing mode, can react to this immediately, before a higher-level closed-loop control determines a changed setpoint value, dependent on a frequency change.

In rather more simple terms, a voltage-influencing unit reacts to a frequency change in a way similar to a directly connected synchronous generator. In any event, a voltage-influencing unit behaves more similarly to a synchronous generator than a current-influencing unit.

The current-influencing units may undertake the power reduction somewhat later, in particular because they receive a reduced current setpoint value. As soon as the current-influencing units have undertaken this power reduction, this may also have an effect on the frequency and voltage, and the controlling component of the voltage-influencing units may then be reduced again. In an ideal case, the power reduction by the voltage-influencing units may as a result be reduced to zero. However, it can often happen that such operation at an overfrequency only occurs very briefly, and the behavior of the voltage-influencing units to this extent remains relevant. In other words, here the voltage-influencing units essentially perform the dynamic closed-loop control, whereas the current-influencing units tend rather to assume the steady state.

According to one embodiment, it is proposed that, in the case of overfrequency in the electrical supply grid, power is taken by the wind farm from the electrical supply grid and in particular is consumed. This embodiment consequently goes one step further than merely reducing power in the case of an overfrequency, in that it is additionally proposed even to take power from the supply grid. The power may then be consumed for example in a chopper system.

It is in this case proposed that the voltage-influencing units are operated to take up the power from the electrical supply grid, at least in the initial time period. Consequently, it is proposed even for the case where power is taken from the grid that at least initially the voltage-influencing units essentially undertake this task here. In principle, it is also provided here that the voltage-influencing units undertake the closed-loop control, particularly at the beginning and consequently at the transition to such an overfrequency situation. Since, however, such a case in which electrical power should even be taken from the grid often only exists for a short transitional time period, this closed-loop control will then also essentially be undertaken overall by the voltage-influencing units.

It has consequently been recognized that, even for the case of power take-up, the voltage-influencing units are particularly well suited for this task.

It is preferably provided that the wind farm feeds into the electrical supply grid with a feed-in voltage. For this purpose, a check is made for phase jumps in the electrical supply grid. Such a phase jump of the grid voltage leads to a phase shift in the grid voltage, that is to say in a temporal respect. The absolute phase position of the grid voltage therefore changes abruptly, so that for example a zero transition of the grid voltage is shifted by a millisecond in comparison with the previous rhythm.

Such a phenomenon can be attributed particularly to the behavior of one or more synchronous generators that are coupled directly to the electrical supply grid. Such synchronous generators have an angular displacement, which depends on the stator current and determines the position of the synchronous generated voltage. A change of the stator current can consequently cause a change of the rotor, and consequently of the phase position of the synchronous generated voltage.

In the case of this embodiment, it is thus proposed that a check is made for corresponding phase jumps. In this case, the method operates in such a way that, in the case of a phase jump, the voltage-influencing units in a first step initially feed in real and/or reactive power, in order to maintain the frequency and/or phase position of the feed-in voltage. The voltage-influencing units therefore react immediately to such a phase jump and in actual fact attempt to resist it. As a result, the phase jump can initially be somewhat counteracted. As a result, an excessive phase jump can also possibly be prevented, and consequently the possible loss of synchronism of a corresponding synchronous generator coupled directly to the electrical supply grid can be prevented. Particularly, this behavior of the voltage-influencing units may at least somewhat stabilize the synchronous generator that has caused the phase jump, though it is also possible that a number of synchronous generators may have caused the phase jump. For this behavior, it is also possible to do without an express check for a phase jump, because an allowance for it is already achieved by the voltage-influencing behavior. For further steps, and consequently the proposed concept overall, a check for a phase jump is however advisable.

If a phase jump is then detected, in a second step a reference frequency, and also or alternatively a reference voltage, of the changed grid voltage may be controlled as a dependent variable. Preferably, only a reference voltage is preset, including in this case the corresponding reference frequency, that is to say in its specific signal form. By specifying this reference frequency or reference voltage in this way, it is thus possible specifically to preset a corresponding reference value that is advantageous for the stability of the electrical supply grid. It comes into consideration in particular that the reference voltage is preset in such a way that the transition from the previous voltage profile before the occurrence of the phase jump to the voltage profile after the occurrence of the phase jump takes place gradually, so that an overreaction in the electrical supply grid is prevented. In this case it also comes into consideration that the behavior of the grid itself is observed for this phase jump, and is used for presetting the reference voltage. For example, the electrical supply grid may react to the phase jump of its own accord, that is to say by feeding-in suppliers or grid participants other than the wind farm reacting to the phase jump, and for example change the phase back or change it in some other way or change a frequency. Such an effect can be observed, in particular measured, and the presetting of the reference frequency or reference voltage preferably takes place at the wind farm in such a way that particularly a resonance in the electrical supply grid, caused by other countermeasures, is counteracted, and therefore such a resonance is prevented.

Finally, it is then provided that the voltage-influencing units control the feed-in voltage as a dependent variable in a way corresponding to the reference frequency or reference voltage. The reference frequency or reference voltage consequently form setpoint values for the closed-loop control of the voltage-influencing units. In particular, a reference frequency or reference voltage may also be preset in such a way that this can be carried out well for the implementation by the voltage-influencing units. By presetting the reference frequency or reference voltage in such a specifically deliberate way, it can therefore be prevented that reactive and/or real currents resulting in implementation do not become too great.

According to one embodiment, it is proposed that the wind farm realizes a voltage-influencing mode with power feed-in by a combined control of the voltage-influencing units and the current-influencing units. It is proposed for this purpose that the voltage-influencing units essentially perform voltage affecting and also or alternatively dynamic compensating operations, and that the current-influencing units essentially perform a steady-state power feed-in.

The voltage-influencing units react particularly quickly to voltage changes or voltage deviations, and are consequently particularly quick closed-loop control tools. This is utilized in this mode of combined control. Consequently, the voltage-influencing units can provide the voltage affecting, but also initiate quick closed-loop control operations.

The current-influencing units, which essentially perform closed-loop control current-dependently, react rather more indirectly to changes in the electrical supply grid in comparison with the voltage-influencing units, in particular indirectly to voltage changes. That is to say that the current-influencing units react essentially to current changes, which may be a consequence of voltage changes, and they react to changed setpoint values, which may for example be preset for them by a higher-level control device. It can in this way be ensured however that the current-influencing units can feed in power comparatively stably and steadily.

According to one embodiment, each feeding-in device is characterized by a power coefficient, in particular a rated power. It is proposed for this purpose that, with reference to the respective power coefficients, the wind farm has a greater proportion of current-influencing units than voltage-influencing units. Therefore, the current-influencing units dominate in the wind farm. Consequently, a good, stable power feed-can be achieved, whereas at the same time a high level of control dynamics can be ensured by the voltage-influencing units.

Preferably, the voltage-influencing units form a proportion of at least 2% and at most 25%, preferably of at most 15% and in particular of at most 10%. These proportions relate to a 100% proportion, which denotes the sum of the power coefficients of all of the feeding-in devices. It is therefore proposed that less than one third, on the basis of the power coefficients, of voltage-influencing units are in the wind farm. Just a proportion of 15% or 20% can ensure the stated concept, that is to say of achieving a good, stable power feed-in by as many current-influencing units as possible, but nevertheless still maintaining a sufficient proportion of voltage-influencing units for purposes of quick closed-loop control.

Preferably, the voltage-influencing units have at least one first droop and the current-influencing units have at least one second droop. Each droop respectively describes a relationship, particularly a linear relationship, between an electrical voltage of the wind farm and a reactive power that is to be fed in or has been fed in. Each droop may also alternatively describe a relationship between a frequency of the wind farm and a real power that is to be fed in or has been fed in. It is proposed for this purpose that the first droop has a smaller gradient than the second droop. In simple terms, the droop of the current-influencing units is steeper than the droop of the voltage-influencing units.

The first droop, that is to say the droop of the voltage-influencing units, particularly describes a relationship between the electrical voltage of the wind farm respectively at the output of the voltage-influencing unit and the reactive power fed in by this voltage-influencing unit. The voltage-influencing unit then sets the electrical voltage particularly at its output, which is consequently a voltage of the wind farm, in dependence on the reactive power that it has itself fed in. In this case, a setpoint value for this voltage is particularly set, that is to say in a way corresponding to the first droop in dependence on the reactive power fed in.

The second droop, that is to say the droop of the current-influencing units, in this case relates to a dependence of the reactive power to be fed in on the electrical voltage of the wind farm. Here, too, the electrical voltage at the output of the current-influencing unit concerned comes into consideration, but here thus forms the input variable. Dependent on this voltage, and correspondingly the second droop, the reactive power to be fed in is then determined, and is preset particularly as a reactive-power setpoint value. Each current-influencing unit then feeds as far as possible a reactive power according to this reactive-power setpoint value.

For the case where the droop presets a dependence between frequency and real power, a frequency setpoint value is preset for the voltage-influencing units in a way corresponding to the first droop in dependence on the real power fed in. For the current-influencing units, a setpoint value for the real power is preset according to the second droop on a frequency-dependent basis.

These different gradients of the droops achieve the effect that the voltage-influencing units initially carry out closed-loop control quickly and with great manipulated variables, whereas the current-influencing units to this extent have a weaker gain, and as a result leave the dynamic closed-loop control essentially to the voltage-influencing units.

According to one embodiment, it is proposed that the voltage-influencing units respectively have at least one first reactive-power droop, which respectively describes a relationship between an electrical voltage to be provided by the voltage-influencing unit in the wind farm and a reactive power that is fed in by the voltage-influencing unit. The first reactive-power droop therefore indicates at what level the voltage-influencing unit is in each case to provide an electrical voltage in the wind farm in dependence on its fed-in reactive power.

It is also proposed that the current-influencing units respectively have at least one second reactive-power droop, which respectively describes a relationship between an electrical voltage recorded in the wind farm and a reactive power to be fed in by the current-influencing unit. The second reactive-power droop therefore indicates how much reactive power the current-influencing unit is to feed in, in dependence on the recorded electrical voltage.

It is thus proposed for this purpose that the first reactive-power droop, that is to say that of the voltage-influencing units, has a smaller gradient than the second reactive-power droop, that is to say that of the current-influencing units. The first droop in this case indicates however how much voltage is to be set in dependence on the reactive power fed in. Just a small value of reactive power fed in can consequently lead to a high voltage value to be set. Therefore, for this the voltage-influencing unit or its closed-loop control is more dominant than the current-influencing units.

Also or alternatively, according to one embodiment, it is proposed that the voltage-influencing units respectively have at least one first real-power droop. The real-power droop respectively gives a relationship between a frequency to be provided in the wind farm by the voltage-influencing unit and a real power that is fed in by the voltage-influencing unit. The first real-power droop therefore indicates how high the frequency should be chosen, in dependence on the real power fed in.

For this purpose, the current-influencing units respectively have at least one second real-power droop, which respectively describes a relationship between a frequency recorded in the wind farm and a real power to be fed in by the current-influencing unit. The second real-power droop therefore indicates at what level the current-influencing unit is intended to feed in amounts of real power in dependence on the recorded frequency.

It is thus proposed for this purpose that the first real-power droop has a smaller gradient than the second real-power droop. Here, too, the frequency is therefore set at the voltage-influencing units in dependence on the real power and, due to the small gradient of the first real-power droop, correspondingly strong frequency deviations are obtained when there are small real-power deviations. Consequently, here, too, the voltage-influencing unit is in each case a quick, dynamic closed-loop control. The voltage-influencing units are to this extent also intended here for the particularly dynamic closed-loop control operations.

It is preferably also proposed that the voltage-influencing units are controlled by the first reactive-power droop in such a way that it controls an electrical voltage to be provided by the voltage-influencing unit in the generating grid in dependence on a reactive power fed in by the voltage-influencing unit in such a way that the reactive power fed in is controlled to a value of almost zero. At least, a steady system deviation that is as small as possible is intended to be achieved. Preferably, though the voltage-influencing units are quickly controlling units, in return it is intended to achieve as far as possible closed-loop control to a value of almost zero in the steady state, at least for the reactive power. A small system deviation, for example in the range of 5% with reference to the respective rated power, may be advisable and create a degree of latitude for a closed-loop control by the current-influencing units.

A wind farm is also proposed. Such a wind farm is intended for exchanging electrical power with an electrical supply grid by way of a grid connection point and comprises a number of wind power installations. Each of the wind power installations has one or more feeding-in devices. A feeding-in device may be a converter or an inverter or an arrangement of converters or inverters.

One or more of the feeding-in devices operate as voltage-influencing units and exchange power with the electrical supply grid in a voltage-influencing manner. One or more of the feeding-in devices operate as current-influencing units and exchange power with the electrical supply grid in a current-influencing manner. The wind farm therefore has voltage-influencing and current-influencing units and this enables it to achieve the advantages that have already been described above in connection with the method for operating a wind farm.

Preferably, each feeding-in device is characterized by a power coefficient, which may particularly be the rated power of the feed-in device, and it is provided that, with reference to the respective power coefficients, the wind farm has a greater proportion of current-influencing units than voltage-influencing units. Preferably, the wind farm has at least 2% and at most 25%, preferably at most 15% and in particular at most 10%, voltage-influencing units. The values relate in this case to a 100% proportion, which denotes the sum of the power coefficients of all of the feeding-in devices of the mind farm. It is therefore proposed that the current-influencing units dominate.

According to a further embodiment, it is proposed that each wind power installation or each feeding-in device has at least one control device and at least one droop is respectively stored in the control device. It is proposed for this purpose that the voltage-influencing units have at least one first droop and the current-influencing units have at least one second droop. Each droop in this case respectively describes a relationship, in particular a linear relationship, between an electrical voltage of the wind farm and a reactive power that is to be fed in or has been fed in. Another droop respectively describes a relationship, particularly a linear relationship, between a frequency of the wind farm and a real power that is to be fed in or has been fed in. It is proposed overall for this purpose that the first droop has a smaller gradient than the second droop. As a result, the control dominances can be split between voltage-influencing units and current-influencing units. In particular, a first droop with a smaller gradient than the second droop has the effect that the voltage-influencing units dominate in dynamic closed-loop control operations.

Preferably, the second droop has at least twice the gradient in comparison with the first droop, in particular at least three times and preferably at least four times the gradient in comparison with the first droop. Because the second droop is at least twice as steep, preferably at least three times as steep and in particular at least four times as steep, a voltage-influencing unit can dominate significantly over a current-influencing unit with regard to their closed-loop control characteristics.

According to a further embodiment, it is proposed that each wind power installation or each feeding device has at least one control device and at least one droop is respectively stored in the control device, the voltage-influencing units respectively having a first droop and the current-influencing units having at least one second droop, each droop respectively describing a relationship, particularly a linear relationship, between an electrical voltage of the wind farm and a reactive power that is to be fed in or has been fed in, or that each droop describes a relationship between a frequency of the wind farm and a real power that is to be fed in or has been fed in, and it being the case for both types of droop that the first droop has a smaller gradient than the second droop. Consequently, the voltage-influencing units can provide a quicker dynamic closed-loop control.

Preferably, in at least one of the wind power installations, in particular in all of the wind power installations of the wind farm, there is respectively provided at least one voltage-influencing unit and one current-influencing unit. As a result, each wind power installation can itself provide benefits of combining current-influencing and voltage-influencing units. Then there is also the fact that, as a result of the current-influencing units, power can particularly be fed in stably and steadily, and consequently the provision of current-influencing units in each wind power installation can also achieve the effect that each wind power installation can therefore feed in well the power generated by it. At the same time, however, each wind power installation is also prepared to achieve dynamic closed-loop control by at least one voltage-influencing unit.

Furthermore, a wind farm can also be planned in an easy way, by in principle each wind power installation having an advantageous proportion of current-influencing and voltage-influencing units. If these proportions are chosen to be the same for each wind power installation, the distribution in each wind power installation at the same time corresponds to the distribution in the wind farm. This also has the advantage that, whenever one wind power installation fails, the distribution of current- and voltage-influencing units in the wind farm remains unchanged. Adding further wind power installations to the wind farm also does not cause the split between voltage-influencing units and current-influencing units to change, even if such an added wind power installation has current- and voltage-influencing units, in particular in the ratio as is provided in the wind farm.

It also comes into consideration, however, that not every wind power installation has current- and voltage-influencing units, but only some of them, and other wind power installations have only current-influencing units. As a result, it is possible to allow for the situation where preferably only a very small proportion of voltage-influencing units are provided in the wind farm. If, for example, only 5% of voltage-influencing units are provided, it could be the case for example in a wind farm with wind power installations which respectively have 10 feeding-in devices that alternately one wind power installation has only current-influencing units and another respectively has one voltage-influencing unit and nine current-influencing units.

Preferably, the wind farm is prepared for the purpose of performing a method according to at least one of the embodiments described above of a method for operating a wind farm. The wind farm is particularly prepared for the purpose that it has corresponding control units in the wind power installations and/or for each feeding-in device. The corresponding method steps may be implemented in these control devices.

It is preferably provided that the wind farm has a central control unit, in order to coordinate the wind power installations and in particular the method for operating the wind farm. The coordination may advantageously take the form that the central control unit provides setpoint values, in particular frequency and voltage setpoint values, for the voltage-influencing units and provides real-power and reactive-power setpoint values to the current-influencing units. By providing such setpoint values, in principle a coordination of the wind farm can be achieved, without particularly high requirements for short reaction times and reacting quickly to grid states having to be ensured by this central control unit. It can achieve the coordination of the wind farm, but very quick closed-loop control processes can be achieved by each wind power installation itself.

Preferably, the wind farm has at least one wind power installation according to one of the following embodiments.

Also proposed is a wind power installation for exchanging electrical power with an electrical supply grid, by way of a grid connection point, comprising:
a number of feeding-in devices, wherein
one or more of the feeding-in devices operate as voltage-influencing units; and
one or more of the feeding-in devices operate as current-influencing units, wherein the voltage-influencing units and the current-influencing units also operate in a voltage-influencing and current-influencing manner during undisturbed operation of the electrical supply grid.

The advantages are evident from the above explanations of the wind farm and/or the method for operating the wind power installation. Reference is also made to the advantages of the following embodiments of a wind power installation.

Preferably, the wind power installation is characterized in that,
each feeding-in device is characterized by a power coefficient, in particular a rated power, and in that, with reference to the respective power coefficients,
the wind power installation has a greater proportion of current-influencing units than voltage-influencing units, wherein preferably,
with reference to a sum of the power coefficients of all of the feeding-in devices as a 100% proportion, the voltage-influencing units have a proportion of at least 2% and at most 25%, preferably a proportion of at most 15% and in particular a proportion of at most 10%.

According to one embodiment, a wind power installation is proposed, characterized in that,
each feeding-in device has at least one control device and at least one droop is respectively stored in the control device, wherein
the voltage-influencing units have at least one first droop, and
the current-influencing units have at least one second droop, wherein
each droop respectively describes a relationship, particularly a linear relationship,
between an electrical voltage of the wind power installation and a reactive power that is to be fed in or has been fed in, or
between a frequency of the wind power installation and a real power that is to be fed in or has been fed in, and wherein
the first droop has a smaller gradient than the second droop.

Preferably, the wind power installation is configured for the purpose of performing a method according to one of the embodiments above of the operating method, and/or of being used in a wind farm according to an embodiment above.

BRIEF DESCRIPTION OF THE SEVERAL VIEWS OF THE DRAWINGS

The invention is explained in more detail by way of example below on the basis of exemplary embodiments with reference to the accompanying figures.

DETAILED DESCRIPTION

Figure 1:
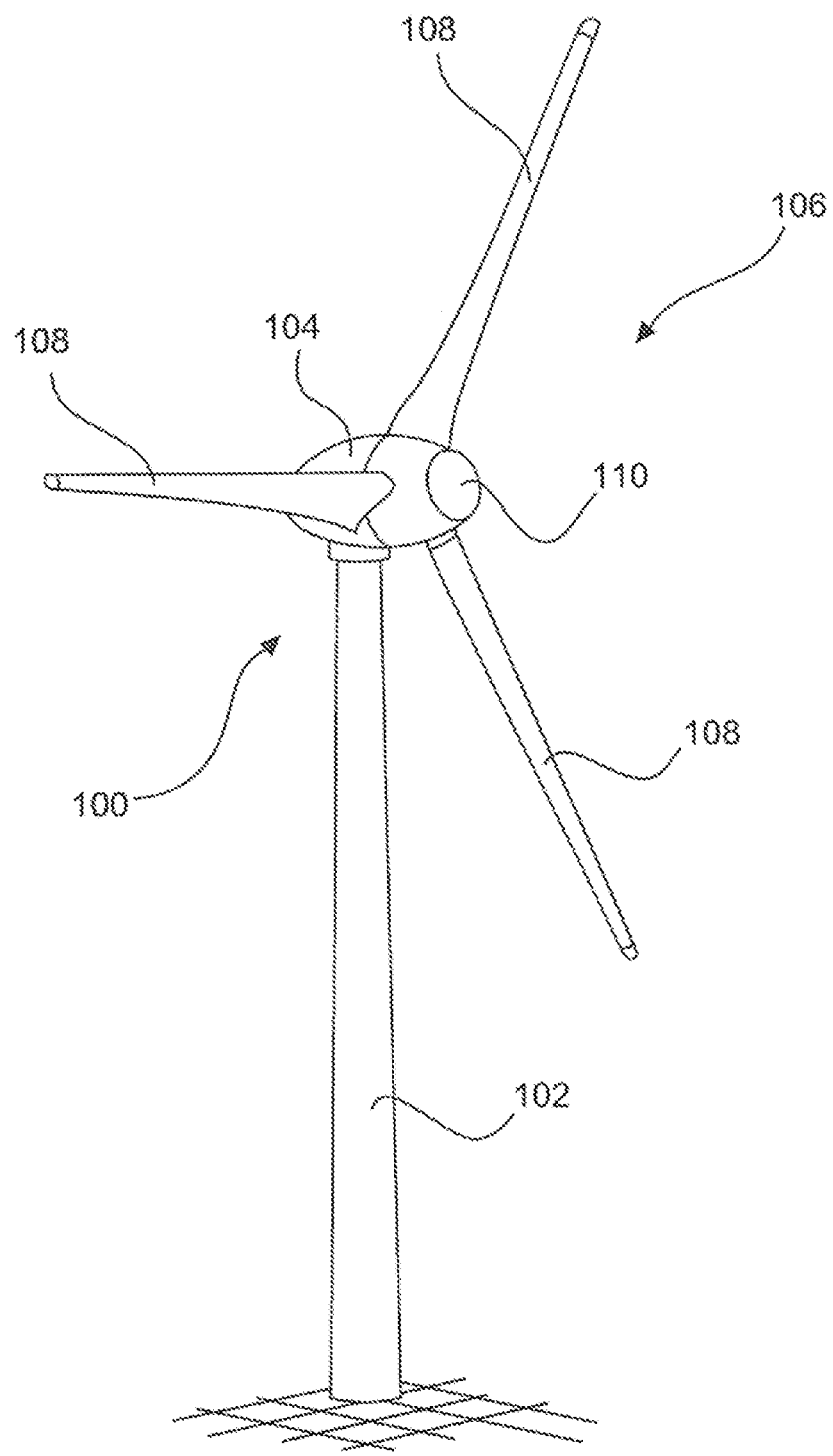
FIG. 1 shows a wind power installation in a perspective representation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in a rotary motion by the wind, and thereby drives a generator in the nacelle 104.

Figure 2:
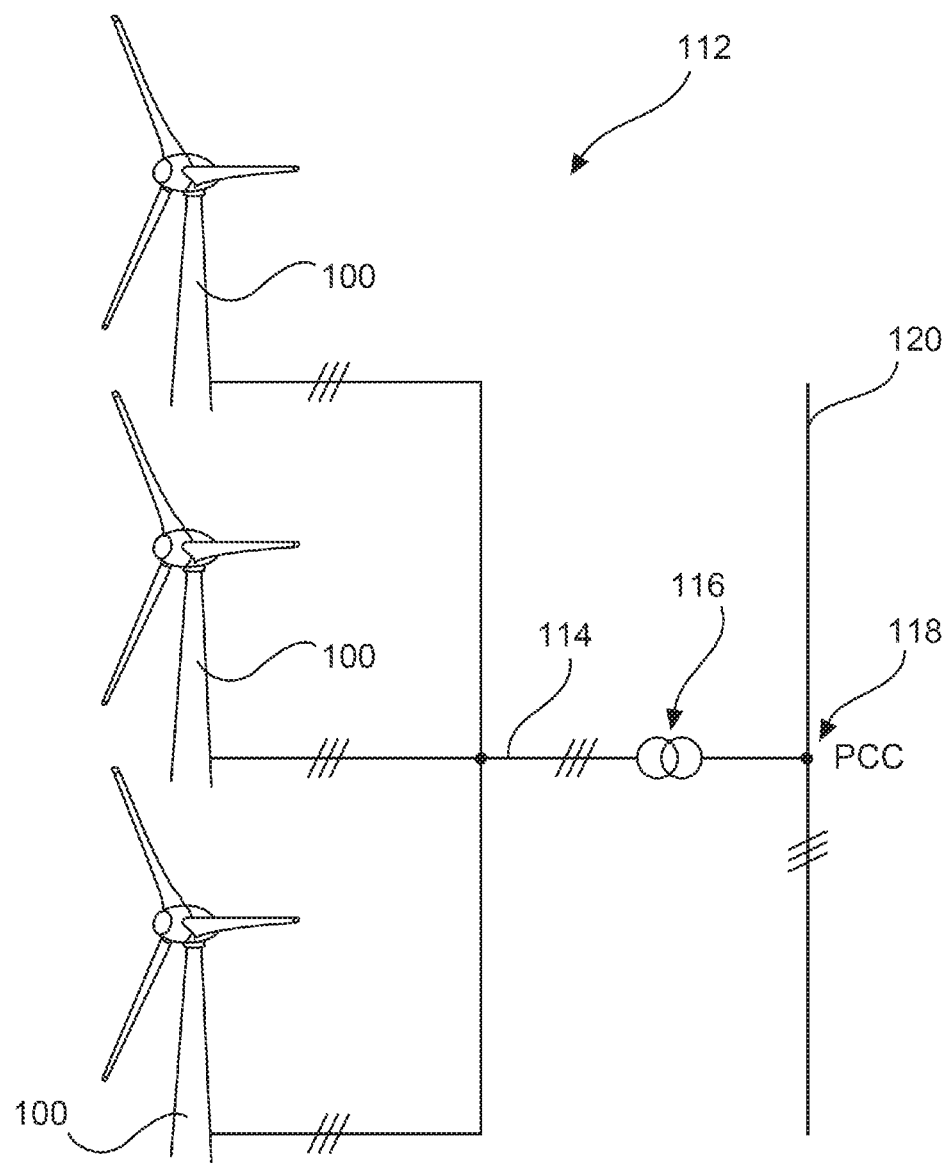
FIG. 2 shows a wind farm in a schematic representation.

FIG. 2 shows a wind farm 112 with, by way of example, three wind power installations 100, which may be the same or different. The three wind power installations 100 are consequently representative of essentially any number of wind power installations of a wind farm 112. The wind power installations 100 provide their power, to be specific in particular the electricity generated, by way of an electrical farm grid 114. In this case, the electricity or power respectively generated by the individual wind power installations 100 is added together and there is usually a transformer 116, which steps up the voltage in the farm in order then to feed into the supply grid 120 at the feed-in point 118, which is also referred to generally as the PCC. FIG. 2 is just a simplified representation of a wind farm 112, which for example does not show any controller, although there is of course a controller. It is also possible for example for the farm grid 114 to be differently designed, in that for example there is also a transformer at the output of each wind power installation 100, to name just one other exemplary embodiment.

Figure 3:
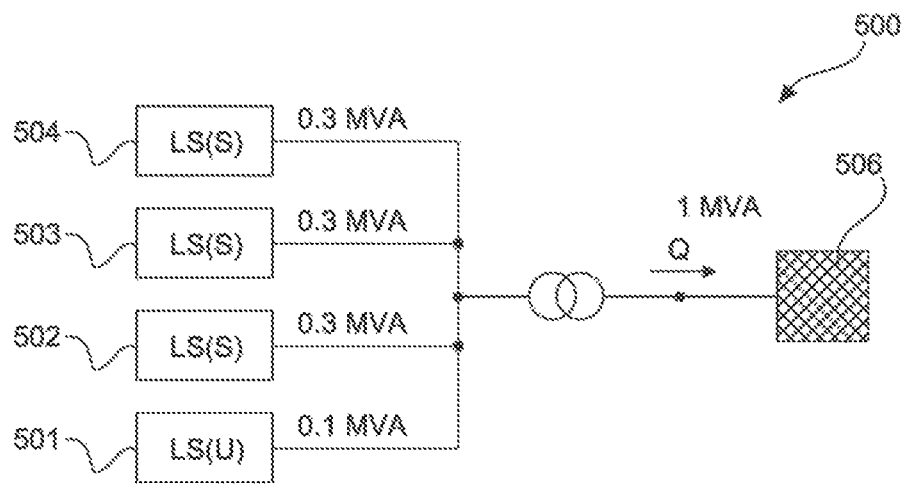
FIG. 3 schematically shows a number of power cabinets of a wind power installation with power splits between current- and voltage-influencing units.

FIG. 3 illustrates a wind power installation 500, which is also representative of other converter-controlled feed-in devices. In the example shown, it has at least four power cabinets 501 to 504. The first power cabinet 501 is provided here as a voltage-influencing power cabinet. It consequently forms a voltage-influencing unit, or it may comprise a number of voltage-influencing units. This voltage-influencing power cabinet 501 is particularly intended to preset a voltage. In this case it is also intended to be able to feed in power, in particular reactive power Q, but only to a slight extent. By way of example, a value of 0.1 MVA is indicated here.

The three other power cabinets 502-504 are provided as current-influencing power cabinets, that is to say as current-influencing units. Each current-influencing power cabinet may also comprise a number of current-influencing units. Each of these power cabinets is intended to be able to feed in a greater reactive power Q than the first power cabinet 501. By way of example, a reactive power value of in each case 0.3 MVA is indicated here as a dimensioning variable for each of the power cabinets 502-504. These four power cabinets 501-504 may together feed a reactive power Q amounting to 1 MVA into the grid 560 shown by way of example. This split also serves primarily for purposes of illustration.

FIG. 3 is however particularly intended to illustrate the split, and accordingly at least one unit operates in a voltage-influencing manner, here the power cabinet 501, and in this case can feed in less reactive power, whereas further units, or possibly only one further unit, may operate in a current-influencing manner, here the power cabinets 502-504, and can also feed in a large amount of reactive power Q for voltage backup. FIG. 3 in this case illustrates the general split between voltage-influencing units and current-influencing units, which here is 10% to 90%. This may also apply with respect to real power.

Figure 4:
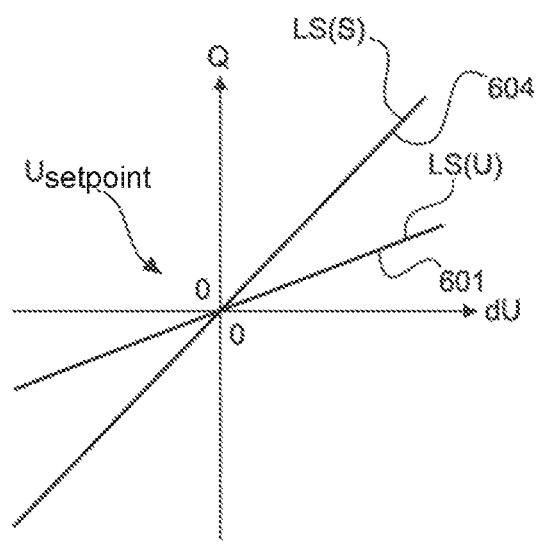
FIG. 4 shows a diagram with different droops of a wind power installation as shown in FIG. 3.

FIG. 4 illustrates different droops for a wind power installation, according to FIG. 3, which indicate a reactive power Q in dependence on a voltage deviation dU. The characteristic curves shown are intended to be taken as a basis for controlling the corresponding power cabinets 501-504 of FIG. 3, to be specific in such a way that the power cabinet 501, which operates in a voltage-influencing manner, operates according to curve 601, whereas the current-influencing power cabinets 502-504 in each case operate according to curve 604. Each of the power cabinets 502-504 therefore feeds in three times as much reactive power Q as the voltage-influencing power cabinet 501 for the same voltage deviation, that is to say for the same dU in the example shown.

Wherein the voltage-influencing power cabinet 501 adapts the voltage deviation dU by way of a setpoint voltage in accordance with the reactive power Q that is obtained and the current-influencing switchgear cabinets adapt the reactive power Q in accordance with the recorded voltage deviation dU. This voltage deviation can be recorded at output terminals of the inverter.

In this case, the graph of FIG. 4 shows the reactive power value 0 and the difference voltage dU with the value 0 at its origin, that is to say the center of the coordinate cross. The fact that the difference voltage dU has the value 0 means that the voltage at that point has the setpoint value Usetpoint. Particularly the voltage-influencing power cabinet 501 controls the voltage value as a dependent variable in such a way that a reactive power close to zero is obtained.

FIG. 4 shows droops for a reactive power in dependence on a voltage deviation. In the same manner, droops for a real power in dependence on a frequency deviation are also proposed. In particular, in FIG. 4, the voltage deviation dU on the x axis could be swapped for a frequency deviation df and the resultant reactive power Q on the y axis could be swapped for a resultant real power P. A representation of droops for a real power in dependence on a frequency deviation is then obtained. For this too, it is proposed that the first supply device, that is to say here the current-influencing power cabinets 502-504, in each case feed in more real power for the same frequency deviation than the second supply device, that is to say here the voltage-influencing power cabinet 501.

Analogously, here, too, the voltage-influencing power cabinet 501 feeds in a voltage at the frequency fin accordance with the real power obtained and the current-influencing switchgear cabinets feed in the real power in accordance with the recorded frequency or frequency deviation.

Figure 5:
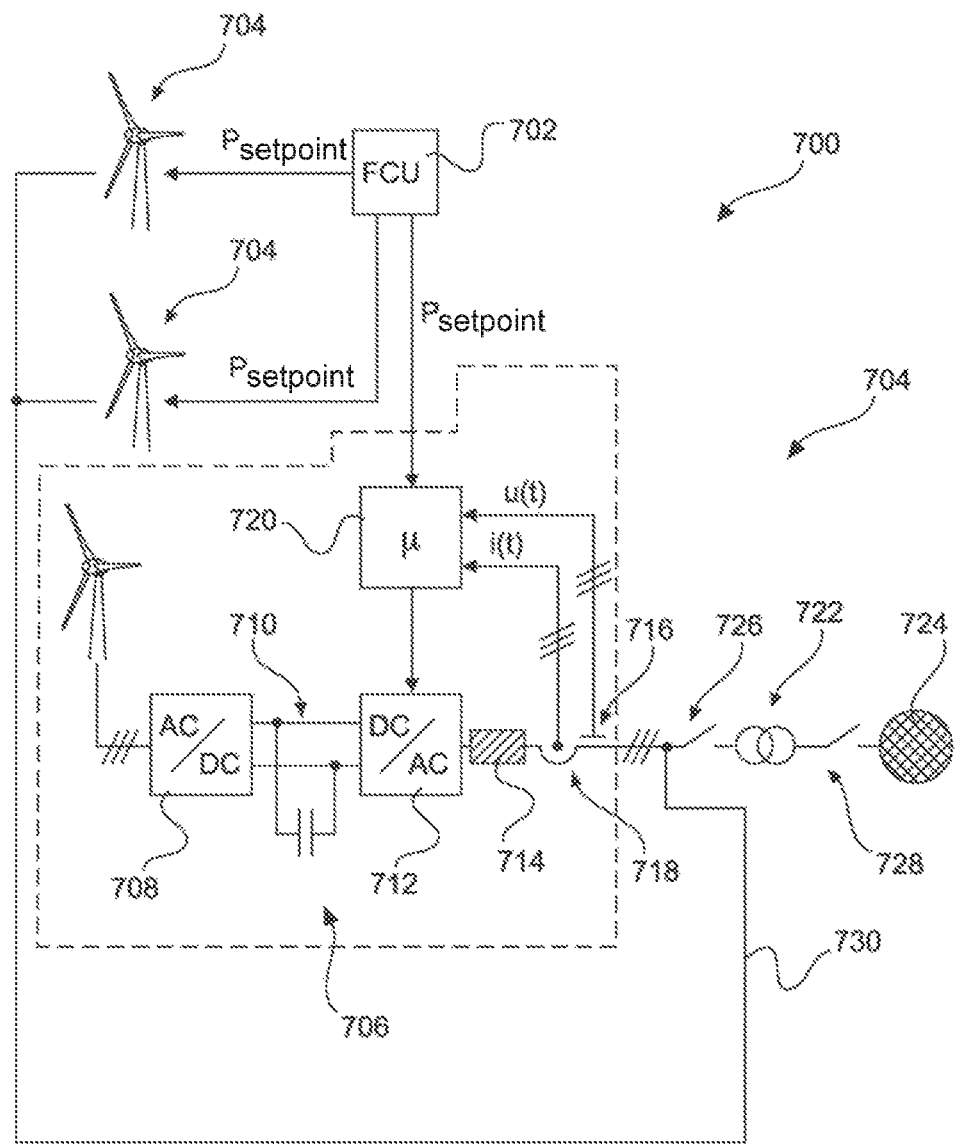
FIG. 5 schematically shows a wind farm and some details of a controller of the wind power installation shown.

FIG. 5 schematically shows a wind farm 700 having a central farm control unit 702 with, by way of example, three wind power installations 704, two of which are only indicated by a symbol and one of which additionally has a control device 706 schematically shown for it.

The control device 706 shown has a rectifying unit 708 with a connected DC link 710 and a downstream inverter 712. The rectifying unit 708 with the DC link 710 and the inverter 712 can also be referred to collectively as a converter.

The rectifying unit 708 is fed by a generator of the wind power installation, which is only indicated in FIG. 5. The energy or power thus obtained is rectified by the rectifying unit 708 and provided on the DC link 710. The inverter 712 generates from it a three-phase AC voltage or AC current. For this purpose, connected to the inverter is an inductor 714, to which the inverter is matched. At the output of this inductor 714, a voltage u(t) and a current i(t) can therefore be measured, and a voltage measuring device 716 (i.e., voltmeter) and a current measuring device 718 (i.e., ammeter) are also provided for the measuring. The voltage thus recorded and the current thus recorded are fed back to an inverter controller 720, and, dependent on this, this inverter controller 720 activates the inverter 712.

The central farm control unit 702 can transmit a power setpoint value Psetpoint to each wind power installation 704. If the wind power installations 704 are each of the same size, there is also the possibility of these values being the same. In actual fact, these power setpoint values Psetpoint are only meant to be representative of possible power setpoint values, which can even have different values, or to be able to be transmitted as relative values, for example percentage values.

In the depicted control device 706 of one wind power installation 704, it is illustrated that this power setpoint value Psetpoint is transferred to the inverter controller 720. There is however also the possibility of other control or evaluation architectures in the wind power installation 704.

The control device 706 shown in FIG. 5 can operate as a current-influencing unit or as a voltage-influencing unit. If it operates as a voltage-influencing unit, particularly the feedback voltage u(t) is used to control the inverter 712. The latter can then generate and output a voltage signal such that it particularly corresponds to a preset voltage characteristic. As a result, the inverter operates in a voltage-influencing manner.

It can also operate in a current-influencing manner, by essentially orienting itself to the recorded and fed-back current i(t) and generating a corresponding current signal, that is to say operating such that its output is particularly controlled as a dependent variable to the current according to a current setpoint value.

This current and voltage affecting or shaping particularly involves the specific sinusoidal signal that the inverter generates or attempts to generate being preset. Correspondingly, the instantaneous values u(t) and i(t) for the voltage and current for feedback are shown in FIG. 5. Of course, the inverter controller 720 can, if necessary, additionally also evaluate and use the amplitude of the respective signals in the sense of an rms value. This feedback of the instantaneous values must also be understood as being respectively in phases, that is to say that three current values and three voltage values are fed back each time.

The inverter 712 can therefore operate in different ways and in so doing generate a power and feed it into the grid 724 by way of a farm transformer 722. The other wind power installations can use the same farm transformer 722 to feed into the electrical supply grid 724.

Furthermore, a respective isolating switch 726 and 728 is provided both for the farm and with respect to the electrical supply grid 724. Indicated upstream of the isolating switch 726 is a connecting line to the other wind power installations 704, this representing a farm grid 730 here.

Figure 6:
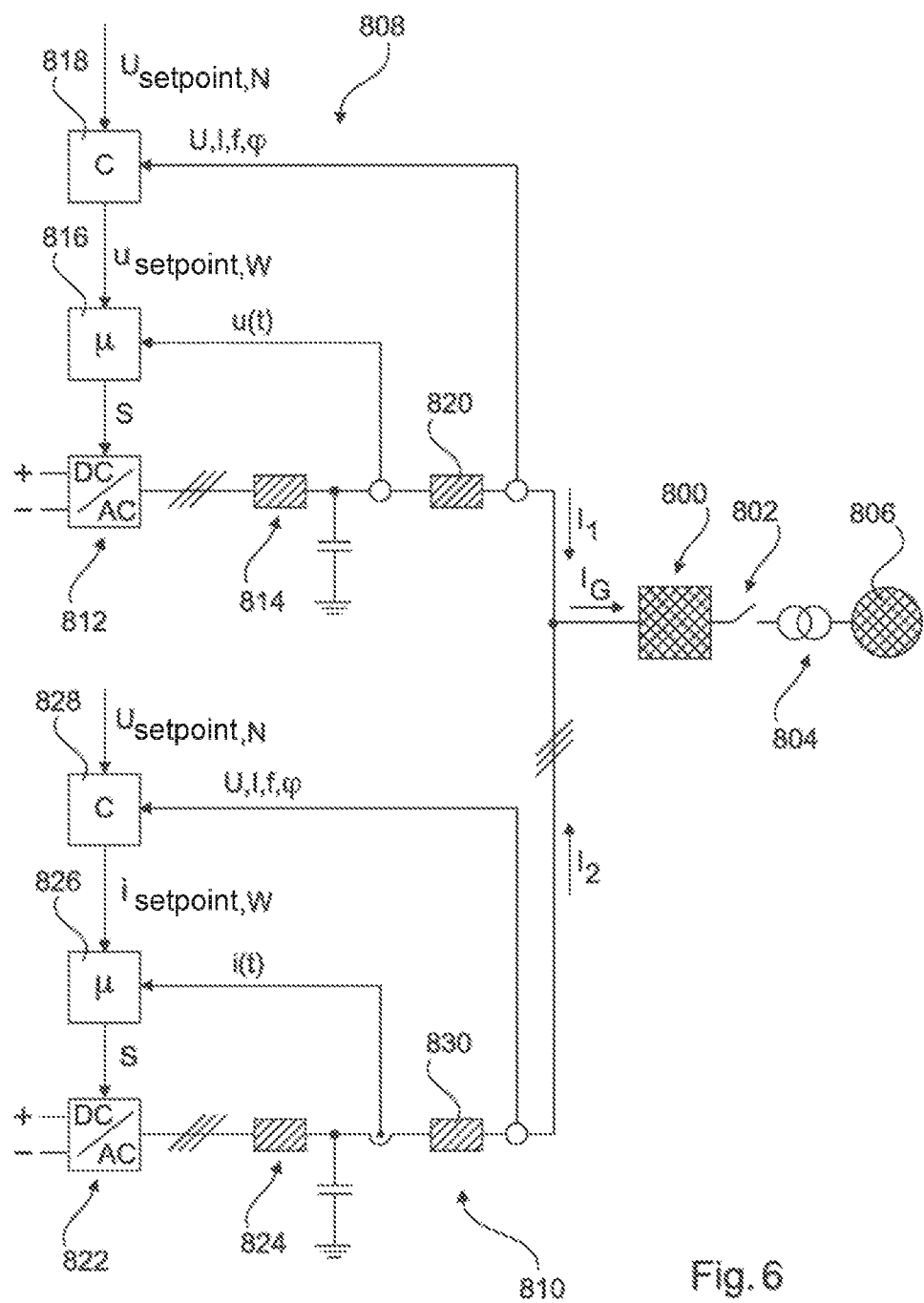
FIG. 6 illustrates the interaction of a voltage-influencing unit with a current-influencing unit.

FIG. 6 shows for illustrative purposes a connecting structure 800, which can be coupled to an electrical supply grid 806 by way of an isolating switch 802 and a connecting transformer 804. The connecting structure 800 may for example be a connection of a number of current- or voltage-influencing units, which together provide electrical power by way of the connecting structure. The connecting structure may for example form or comprise an interconnection of all of the power cabinets in a wind power installation.

Shown for illustrative purposes are a voltage-influencing unit 808 and a current-influencing unit 810, which themselves are also part of the connecting structure 800.

The voltage-influencing unit 808 has a voltage-influencing inverter 812 that generates a voltage u(t) at its output and which voltage is in particular measured at the output of the indicated first output filter 814. The voltage u(t) is continually measured and fed back into the first microcontroller 816. The first microcontroller 816 to this extent evaluates the instantaneous values of this measured voltage u(t). These measured values, just like the output voltage, are also three-phase. However, an explanation of FIG. 6 does not require this three-phase situation to be discussed. This also applies to the current-influencing unit 810.

The first microcontroller 816 is additionally provided with a voltage signal usetpoint,w specifying the voltage u(t) to be set according to magnitude, frequency and phase.

This setpoint value usetpoint,w is generated in the first inverter controller 818. It is dependent on a setpoint voltage Usetpoint,N and the measured values U, I, f, φ that are measured at the output of the first grid inductor 820.

The current-influencing unit 810, which operates in a current-influencing manner, has a current-influencing inverter 822 that operates in a similar manner to the voltage-influencing inverter 812 but controls to an output current i(t). This output current i(t) is recorded at the output of the indicated second output filter 824 and evaluated in the second microcontroller 826. The second microcontroller 826 is therefore provided with a current setpoint value isetpoint,w that presets the current i(t) to be generated according to magnitude, frequency and phase. The second microcontroller 826 correspondingly controls the switching actions in the current-influencing inverter 822, this being indicated by the reference sign S. Correspondingly, the first microcontroller 816 otherwise controls switching actions in the inverter 812.

The current setpoint value isetpoint,w is determined in the second inverter controller 828. It is dependent on the voltage U, the current I, the frequency f and the phase angle φ, and these variables are recorded at the output of the second grid inductor 830. The second inverter controller 828 also receives a setpoint voltage Usetpoint,N as an input variable too. The first and second inverter controllers 818 and 828 may also be combined in a common inverter controller.

The voltage-influencing unit 808 therefore ultimately generates a first current I1 and the current-influencing unit 810 ultimately generates a second current I2. These two currents I1 and I2 are added to produce the joint current IG. This flows for illustrative purposes into the symbolized farm grid 800. This is intended to be understood as an illustration because the voltage-influencing unit 808 and the current-influencing unit 810 are also part of the farm grid 800. To this extent, the joint current IG flows into the remaining part of the farm grid.

During operation, if for example a sudden change in reactive power or a phase jump occurs in the farm grid 800, this becomes noticeable in the joint current IG. Because the output current I2 of the current-influencing unit 810 is controlled by the latter, a change in the joint current IG therefore initially only leads to a change in the first current I1 of the voltage-influencing unit 808.

The change in the joint current IG has therefore initially led to a change in the first current I1, and this has been recorded by the first inverter controller 818. The first inverter controller 818 records from it, in dependence on a reactive power droop or real power droop, a new value for a voltage amplitude and/or a frequency. Correspondingly, the voltage setpoint signal usetpoint,w is adapted and transferred to the first microcontroller 816. The latter then correspondingly activates the voltage-influencing inverter 812. This correspondingly leads to a change in the voltage amplitude and/or in the frequency of the voltage, and this is measured by the current-influencing unit 810 by the measurement at the output of the second grid inductor 830 and is evaluated in the second inverter controller 828. Dependent on this, a new reactive power value and/or a new real power value is then calculated, to be specific dependent on the underlying reactive power droop or real power droop. Correspondingly, a setpoint current signal isetpoint,w is preset and transferred to the second microcontroller 826. The latter then activates the current-influencing inverter 822 correspondingly. The result is that the second current I2 now changes, as a result of which the first current I1 also changes and this in turn leads to a new adaptation by the first inverter controller 818, to be specific again based on the corresponding droops, that is to say the reactive power droop and/or the real power droop.

Ultimately, the voltage-influencing unit 808 and the current-influencing unit 810 will therefore adjust themselves to one another in such a way that they feed in a corresponding real or reactive power in a way corresponding to the droop relevant to them for the same voltage deviation and the same frequency. It has consequently been recognized that system services are known from wind power installations. However, at present these have been adapted to the physical characteristics of the previously dominant feeding-in technology, which is based on large-scale power plants with synchronous machines.

It has also been recognized that, depending on the grid operating point, in the short and medium term the feeding-in technology should adopt the system responsibility that is dominant at the time, that is to say conventional or inverter-based. Simply replicating conventional, usually slowly responding, generators by inverters does not appear to be productive.

Nevertheless, it may be necessary under some circumstances also to ensure voltage affecting in the future by inverter-based systems. In this case, the inverters must not operate in a current-influencing manner, but in a voltage-influencing manner.

This has the following advantages:

An initial voltage affecting can be achieved during the black start and grid recovery of an energy supply grid, while it is proposed here not to restrict the use of voltage-influencing inverters to this.

Provision of a voltage affecting without additional energy stores and without an adaptation of the control strategy may become possible. DC link control by inverters on the grid side may be proposed for this.

A restriction of the frequency gradients in grids with high inverter penetration and protection of the remaining directly coupled machines becomes possible.

Static load balancing may be made possible.

Improved response to faults and handling of faults can be achieved, and thereby enhanced failure characteristics.

Provision of initial fault currents for initiating grid protection is achievable.

An instantaneous generator reaction to frequency drops and voltage drops is made possible, for example in the case of a system split.

Improved frequency and voltage stability is also achievable.

Since an inverter system with voltage affecting should maintain a certain power reserve, in order that voltage-influencing operation is not put at risk by the current limits of the inverters, voltage-influencing inverters usually have a lower power density and are more expensive.

A desired aim is consequently also to provide the voltage-influencing characteristics at lowest possible cost, and consequently with fewest possible voltage-influencing inverter units.

At least some embodiments relate to open-loop and closed-loop control strategies for wind power installations and other power-electronically coupled feeding-in suppliers, in order to provide voltage-influencing characteristics in parallel grid operation. It is intended in this way to achieve the effect of increasing the proportion of inverter-based generation in integrated grid systems and developing a closed-loop control concept for grids that are operated or realized at times almost completely by inverter-coupled feeding in of renewable energies, without any appreciable disadvantages in the reliability of the system.

The following problem in this respect was also recognized: Conventional power plants, to be specific those with directly coupled synchronous machines, have voltage-influencing characteristics in physical terms. Since most regenerative feeding-in suppliers do not have directly coupled synchronous machines, or it is not advisable for them to be used for other reasons, they will not be available in the future.

Solutions can be proposed for the following problems:

provision of voltage-influencing characteristics by inverter-fed feeding-in suppliers;

possible black start with regenerative power plant capacities;

speeded-up grid recovery with regenerative power plant capacities;

grid integration of an at times very high proportion of renewable energies in the grid;

more reliable grid operation, even in grids that are at times supplied almost completely on an inverter basis;

adoption of system responsibility in the electrical energy supply by wind power installations or wind farms;

avoidance of a pseudo-technical cap on the development of renewable energy generators;

substitution of conventional power plants; and increasing the acceptance of regenerative feeding-in suppliers among grid operators.

According to the disclosure, at least according to one or more embodiments, the following has consequently been recognized.

Since power-electronic feeding-in suppliers usually consist of a certain number of parallel units, that is to say particularly parallel-connected converters or inverters, which exchange power with the grid, the proposed solution is to use a small number of units for the actual voltage affecting and to divide the power quickly among the individual units by way of a combined quick, decentralized controller. This succeeds in making the entire feeding-in supplier act in a voltage-influencing manner with only a few units.

In a first step, the units that exchange power with the grid are divided into voltage-influencing units and current-influencing units. A ratio of for example 1:9 appears to be advisable in this respect. Therefore, such a ratio is proposed, in particular a ratio in the range from 1:5 to 1:20, preferably 1:8 to 1:16. The ratio may however also be adapted grid-situation-dependently. It relates to the rated power of each unit. In case of units of the same size, which is preferably proposed, the ratio indicates numbers, that is to say the number of voltage-influencing units to the number of current-influencing units.

For splitting the power, the current-influencing units are in this case operated with two droops:

For the reactive power in dependence on the voltage, a so-called Q(U) droop is preset. In this case, a setpoint voltage is preset for the inverter. In dependence on the deviation from the setpoint voltage, the inverter then feeds in a reactive power.

For the power in dependence on the frequency, a so-called P(f) droop is preset. In this case, at the rated frequency there will be the setpoint power, which may be a preset setpoint power or supply-related maximum power. When there is a frequency deviation, the power is adapted in accordance with a droop.

The voltage-influencing units are likewise operated with two droops, but in dependence on the other reference variable respectively. They control the voltage in dependence on the reactive power that has just been established, or the frequency in dependence on the real power that has just been established.

In this case, the two systems differ in three respects:

1. At the rated voltage and rated frequency, the operating points of the voltage-influencing inverters are in each case zero, or close to zero.

2. The droops of the current-influencing units are much steeper, to be specific approximately or at least about five times steeper, than those of the voltage-influencing units. A system deviation in the static case is therefore dealt with almost completely by the current-influencing units, because there are more current-influencing units that have a steeper droop.

3. The control of the setpoint values of the voltage-influencing units as a dependent variable is much quicker than that of the current-influencing units.

If, for example, an upward frequency drift occurs, which indicates surplus power in the grid, the voltage-influencing inverters initially take over completely the additional currents resulting from the frequency and the phase shift. This means that there is a real-power take-up, and the frequency is in the first moment "fixed".

However, the closed-loop control quickly controls the setpoint frequency as a dependent variable to the value resulting from the droop, to be specific in accordance with the resultant power.

The current-influencing inverters then see the frequency deviation and increase the real power.

The same applies analogously to the voltage and the reactive power.

The invention claimed is:

1. A method for operating a wind power installation or a wind farm with a plurality of wind power installations, the method comprising:
    exchanging, via a grid connection point, electrical power between the wind farm and an electrical supply grid, each wind power installation of the plurality of wind power installations having a plurality of feeding-in devices, the wind power installation or the wind farm being connected to the electrical supply grid by the grid connection point;
    operating one or more first feeding-in devices of the plurality of feeding-in devices as voltage-influencing units in a voltage-influencing manner during undisturbed operation of the electrical supply grid; and
    operating one or more second feeding-in devices of the plurality of feeding-in devices as current-influencing units in a current-influencing manner during the undisturbed operation of the electrical supply grid.

2. The method as claimed in claim 1, comprising:
    exchanging, by the voltage-influencing units, electrical power with the electrical supply grid in the voltage-influencing manner for operating the wind farm;
    exchanging, by the current-influencing units, electrical power with the electrical supply grid in the current-influencing manner for operating the wind farm;
    controlling, by the current-influencing units, in current-influencing operation a feed-in current that is to be fed into the electrical supply grid; and
    controlling, by the voltage-influencing units, in voltage-influencing operation the feed-in current that is to be fed into the electrical supply grid, wherein:
        the current-influencing units adapt, in the current-influencing operation, to a feed-in voltage present at the grid connection point, or
        the voltage-influencing units, in the voltage-influencing operation, respectively feed in a current that is at least one of:
    required for controlling the feed-in voltage or obtained by controlling the feed-in voltage.

3. The method as claimed in claim 1, wherein in the case of an overfrequency in the electrical supply grid:
    the electrical power fed into the electrical supply grid by the wind farm is reduced;
    the voltage-influencing units reduce their feed-in power in an initial time period to reduce the electrical power fed in;
    when the reduction of the electrical power fed in at the wind farm has assumed a steady value, the current-influencing units follow the voltage-influencing units by reducing their feed-in power to reduce the electrical power fed in in a subsequent time period following the initial time period;
    the voltage-influencing units are operated to maintain a feed-in voltage; and
    in the subsequent time period, the current-influencing units reduce the electrical power fed in by the wind farm.

4. The method as claimed in claim 3, wherein in the case of the overfrequency in the electrical supply grid:
    electrical power is taken by the wind farm from the electrical supply grid and consumed, wherein the voltage-influencing units are operated to take the electrical power from the electrical supply grid at least in the initial time period.

5. The method as claimed in claim 1, comprising:
    operating the current-influencing units such that the current-influencing units change a feed-in current based on a grid frequency if the grid frequency deviates from a rated grid frequency by at least a predetermined minimum amount.

6. The method as claimed in claim 1, comprising:
    feeding, by the wind farm into the electrical supply grid, electrical power with a feed-in voltage;
    determining whether a phase jump occurs in the electrical supply grid leading to a phase shift in a grid voltage;
    in response to determining that the phase jump occurred, operating the voltage-influencing units, in a first step, initially to feed in real or reactive power to maintain a frequency or a phase position of the feed-in voltage; and
    in a second step, controlling a reference frequency or a reference voltage of the grid voltage as a dependent variable; and
    controlling, by the voltage-influencing units, the feed-in voltage as a dependent variable corresponding to the reference frequency or the reference voltage.

7. The method as claimed in claim 1, comprising:
    operating the wind farm in a voltage-influencing mode with the electrical power feed-in by a combined control of the voltage-influencing units and the current-influencing units, wherein:
        the voltage-influencing units perform voltage affecting or dynamic compensating operations; and
        the current-influencing units perform a steady-state power feed-in.

8. The method as claimed in claim 1, wherein:
each feeding-in device of the plurality of feeding-in devices has a power coefficient that is a rated power; and
the wind farm has a greater number of the current-influencing units than the voltage-influencing units.

9. The method as claimed in claim 8, wherein power coefficients of the voltage-influencing units are between 2% and 25% of a sum of power coefficients of all of the plurality of feeding-in devices.

10. The method as claimed in claim 1, wherein:
the voltage-influencing units have at least one first droop;
the current-influencing units have at least one second droop having a greater gradient than the at least one first droop; and
each droop respectively describes a relationship at least between an electrical voltage of the wind farm and a reactive power to be fed in or has been fed in, or between a frequency of the wind farm and a real power to be fed in or has been fed in.

11. The method as claimed claim 1, wherein:
the voltage-influencing units respectively have at least one first reactive-power droop, which respectively describes a relationship between an electrical voltage to be provided by each voltage-influencing unit in the wind farm and a reactive power that is fed in by the voltage-influencing unit;
the current-influencing units respectively have at least one second reactive-power droop, which respectively describes a relationship between an electrical voltage recorded in the wind farm and a reactive power to be fed in by each current-influencing unit;
the first reactive-power droop has a smaller gradient than the second reactive-power droop;
the voltage-influencing units respectively have at least one first real-power droop, which respectively describes a relationship between a frequency to be provided by the voltage-influencing unit in the wind farm and a real power that is fed in by the voltage-influencing unit;
the current-influencing units respectively have at least one second real-power droop, which respectively describes a relationship between a frequency recorded in the wind farm and a real power to be fed in by the current-influencing unit; and
the first real-power droop has a smaller gradient than the second real-power droop.

12. The method as claimed in claim 11, wherein
the voltage-influencing units are controlled by the first reactive-power droop in such a way that the first reactive-power droop is used to set the electrical voltage to be provided by the voltage-influencing unit in an energy generating grid based on the reactive power fed in by the voltage-influencing unit such that the reactive power fed in is controlled to a value of substantially zero.

13. A wind farm for exchanging electrical power with an electrical supply grid via a grid connection point, comprising:
a plurality of wind power installations, each wind power installation of the plurality of wind power installations has a plurality of feeding-in devices, wherein:
one or more first feeding-in devices of the plurality of feeding-in devices operate as voltage-influencing units and exchange power with the electrical supply grid in a voltage-influencing manner during undisturbed operation of the electrical supply grid; and
one or more second feeding-in devices of the plurality of feeding-in devices operate as current-influencing units and exchange power with the electrical supply grid in a current-influencing manner during the undisturbed operation of the electrical supply grid.

14. The wind farm as claimed in claim 13, wherein:
each feeding-in device of the plurality of feeding-in devices has a power coefficient that is a rated power;
the wind farm has a greater number of the current-influencing units than the voltage-influencing units; and
power coefficients of the voltage-influencing units are between 2% and 25% of a sum of power coefficients of all of the plurality of feeding-in devices.

15. The wind farm as claimed in claim 13, wherein:
the wind farm or each feeding-in device of the plurality of feeding-in devices has at least one control device that stores a respective at least one droop;
the voltage-influencing units have at least one first droop;
the current-influencing units have at least one second droop having a greater gradient than the at least one first droop; and
each droop respectively describes a relationship at least between an electrical voltage of the wind farm and a reactive power to be fed in or has been fed in, or between a frequency of the wind farm and a real power to be fed in or has been fed in.

16. The wind farm as claimed in claim 13, wherein at least one wind power installation of the plurality of wind power installations has at least one voltage-influencing unit and at least one current-influencing unit.

17. The wind farm as claimed in claim 13, comprising:
a central control unit configured to coordinate the plurality of wind power installations and operate the wind farm.

18. A wind power installation for exchanging electrical power with an electrical supply grid via a grid connection point, comprising:
a plurality of feed-in devices; wherein
one or more first feed-in devices of the plurality of feed-in devices operate as voltage-influencing units during undisturbed operation of the electrical supply grid; and
one or more second feed-in devices of the plurality of feed-in devices operate as current-influencing units during the undisturbed operation of the electrical supply grid.

19. The wind power installation as claimed in claim 18, wherein:
each feed-in device of the plurality of feed-in devices has a power coefficient that is a rated power;
the wind power installation has a greater number of the current-influencing units than the voltage-influencing units; and
power coefficients of the voltage-influencing units are between 2% and 25% of a sum of power coefficients of all of the plurality of feed-in devices.

20. The wind power installation as claimed in claim 18, wherein:
each feed-in device of the plurality of feed-in devices has at least one control device that stores a respective at least one droop;
the voltage-influencing units have at least one first droop;
the current-influencing units have at least one second droop having a greater gradient than the at least one first droop; and each droop respectively describes a relationship at least between an electrical voltage of the wind power installation and a reactive power to be fed in or has been fed in, or between a frequency of the wind power installation and a real power to be fed in or has been fed in.

* * * * *